(12) United States Patent
Lai

(10) Patent No.: US 9,086,176 B2
(45) Date of Patent: Jul. 21, 2015

(54) VALVE STRUCTURE

(71) Applicant: Hung-Lin Lai, Changhua (TW)

(72) Inventor: Hung-Lin Lai, Changhua (TW)

(73) Assignee: Wen Sheng Fu Co. Ltd., Changhua (TW)

( * ) Notice: Subject to any disclaimer, the term of this patent is extended or adjusted under 35 U.S.C. 154(b) by 267 days.

(21) Appl. No.: 13/846,468

(22) Filed: Mar. 18, 2013

(65) Prior Publication Data

US 2014/0264117 A1  Sep. 18, 2014

(51) Int. Cl.
*F16L 15/04* (2006.01)

(52) U.S. Cl.
CPC ...................... *F16L 15/04* (2013.01)

(58) Field of Classification Search
CPC ................. F16L 15/04; F16L 15/00
USPC .......... 251/148, 150, 315.01; 285/334.1, 348, 285/354, 389
See application file for complete search history.

(56) References Cited

U.S. PATENT DOCUMENTS

| 193,993 | A | * | 8/1877 | Pennie | 285/148.11 |
|---|---|---|---|---|---|
| 433,750 | A | * | 8/1890 | Shields | 285/334.1 |
| 896,204 | A | * | 8/1908 | Glauber | 277/626 |
| 2,080,271 | A | * | 5/1937 | Hirst | 277/622 |
| 2,112,239 | A | * | 3/1938 | Stephen | 285/334.5 |
| 2,993,677 | A | * | 7/1961 | Ford | 251/148 |
| 3,167,333 | A | * | 1/1965 | Hall et al. | 285/357 |
| 3,194,592 | A | * | 7/1965 | Boughton | 285/342 |
| 3,404,905 | A | * | 10/1968 | Albrecht | 285/249 |
| 3,596,933 | A | * | 8/1971 | Luckenbill | 285/94 |
| 3,633,944 | A | * | 1/1972 | Hamburg | 285/81 |
| 3,679,239 | A | * | 7/1972 | Schmitt | 285/148.22 |
| 3,989,283 | A | * | 11/1976 | Pepper | 285/323 |
| 4,023,773 | A | * | 5/1977 | Wise | 251/148 |
| 4,062,572 | A | * | 12/1977 | Davis | 285/55 |
| 4,082,326 | A | * | 4/1978 | Bryson | 285/238 |
| 4,407,482 | A | * | 10/1983 | Daghe et al. | 251/148 |
| 4,500,118 | A | * | 2/1985 | Blenkush | 285/247 |
| 4,878,697 | A | * | 11/1989 | Henry | 285/250 |
| 5,056,755 | A | * | 10/1991 | Jang et al. | 251/148 |
| 5,074,599 | A | * | 12/1991 | Wirbel et al. | 285/93 |
| 5,120,092 | A | * | 6/1992 | Gorog et al. | 285/15 |
| 5,121,949 | A | * | 6/1992 | Reese | 285/255 |
| 5,480,122 | A | * | 1/1996 | Barker | 251/148 |
| 5,566,708 | A | * | 10/1996 | Hobbs, Jr. | 137/360 |
| 5,655,750 | A | * | 8/1997 | Smock et al. | 251/148 |
| 5,735,307 | A | * | 4/1998 | Charron | 137/270 |
| 5,992,823 | A | * | 11/1999 | Hung-Lin | 251/315.14 |
| 6,059,261 | A | * | 5/2000 | Han | 251/148 |
| 6,481,761 | B2 | * | 11/2002 | Schroeder et al. | 285/334.3 |
| 2007/0164563 | A1 | * | 7/2007 | Arstein et al. | 285/249 |

* cited by examiner

*Primary Examiner* — John K Fristoe, Jr.
*Assistant Examiner* — David Colon Morales
(74) *Attorney, Agent, or Firm* — Che-Yang Chen; Law Office of Michael Chen

(57) ABSTRACT

A valve structure may include a valve body having a plurality of connecting tubes; a resilient cover, one end of which forming a ring portion and the other of which having a tapered cone portion, and the resilient cover plugs into the connecting tube through the cone portion to form a restricting position; a connecting unit that is tubular, having a tubular connecting section and a plugging section, and the plugging section plugs into the through hole of the resilient cover, so the second stopping surface is against the ring portion of the resilient cover; and a locking cover covering the tubular connecting section of the connecting unit to secure the connecting unit and the resilient cover at the connecting tube of the valve body.

5 Claims, 4 Drawing Sheets

VALVE STRUCTURE

FIELD OF THE INVENTION

The present invention relates to a water valve structure, and more particularly to an improved valve structure that can connect different types of tubes and enhance the anti-leaking effect.

BACKGROUND OF THE INVENTION

PVC tube may be made by polyvinyl chloride resin, stabilizer, and lubricant mixing in a certain percentage and extruded by hot processing. PVC is the earliest developed plastic tube material that is used in our daily lives. Since PVC tube is hard, corrosion resistant, easy to connect, and cheap, so it is widely used in water supplying systems. When in use, the PVC tube uses a valve to connect two tube materials and the valve is used as a water-supplying switch. However, the water input end and output end of the valve have thread section, so the tubes can only be connected through the threads, but this connecting means is not suitable for PVC tubes. Also, when the PVC tubes and metal tubes are connected simultaneously, another PVC tube specific connector is needed. So, it is not only inconvenient, but also easy to leak due to poor tightness.

SUMMARY OF THE INVENTION

The present invention wants to solve the problems present above to provide an improved valve structure which may include a valve body, a resilient cover, a connecting unit and a locking cover. The valve body has multiple connecting tubes, and a handle is formed at junctions of the connecting tubes, and the connecting tube has outer threads. Also, the valve body has a ball valve inside and the handle is connected to the ball valve to form a switch. One end of the resilient cover forms a ring portion, diameter of which is larger than that of the connecting tube. The other end of the resilient cover has a tapered cone portion, diameter of which is smaller than the connecting tube. A first stopping surface is formed from the ring portion facing the cone portion, and a through hole is formed between the ring portion and the cone portion, and the through hole is enlarging from the cone portion to the ring portion. The resilient cover plugs into the connecting tube through the cone portion, and the first stopping surface of the ring portion is against the connecting tube to form a restricting position, so that the through hole of the resilient cover is communicating with the connecting tube of the valve body. The connecting unit is tubular having a tubular connecting section and a plugging section with shrinking diameter. A second stopping surface is formed from the tubular connecting section facing the plugging section, and the plugging section of the connecting unit plugs into the through hole of the resilient cover, so the second stopping surface is against the ring portion of the resilient cover. Also, the plugging section of the connecting unit is shrinking from the tubular connecting section, so the plugging section can easily plug into the through hole to form a tight sealing effect. Furthermore, a through opening is formed between the tubular connecting section and the plugging section of the connecting unit, and the inner wall of the through opening toward the direction of the tubular connecting section has a third stopping surface. A PVC tube is plugged at the through opening of the connecting unit, so the PVC tube can be attached and secured to the third stopping surface. The locking cover covers the tubular connecting section of the connecting unit, and inner threads are used to engage with the outer threads of the connecting tube to secure the connecting unit and the resilient cover at the connecting tube of the valve body. A stopping ring is formed on an opposite end of the inner threads of the locking cover, and the stopping ring connects to the tubular connecting section of the connecting unit to prevent the connecting unit from falling off from the stopping ring, wherein the connecting tube of the valve body may have a nut, and a conjugating unit is disposed between the connecting tube and the nut, and an outer metal tube is connected due to the pressure from the nut to the conjugating unit.

The first object of the present invention is that one end of the resilient cover forms a ring portion, diameter of which is larger than that of the connecting tube, and the other end of the resilient cover has a tapered cone portion, diameter of which is smaller than the connecting tube, and the resilient cover is squeezed and clamped between the connecting tube and the connecting unit to achieve the goal of anti-leaking.

The second object of the present invention is that a first stopping surface is formed from the ring portion facing the cone portion, and a second stopping surface is formed from the tubular connecting section facing the plugging section, an when the resilient cover and the connecting unit are disposed at the connecting tube, the first stopping surface of the ring portion is against the connecting tube, and the second stopping surface of the connecting unit is against the ring portion of the resilient cover, so as to use the ring portion to enhance the positioning effect of the resilient cover, so the resilient cover will not deform too much generate movement and the contact areas of the connecting tube, resilient cover and connecting unit are increased to enhance the anti-leaking effect.

The third object of the present invention is that the through hole is enlarging from the cone portion to the ring portion and the plugging section of the connecting unit is shrinking from the tubular connecting section, so the plugging section can easily plug into the through hole to form a tight sealing effect.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
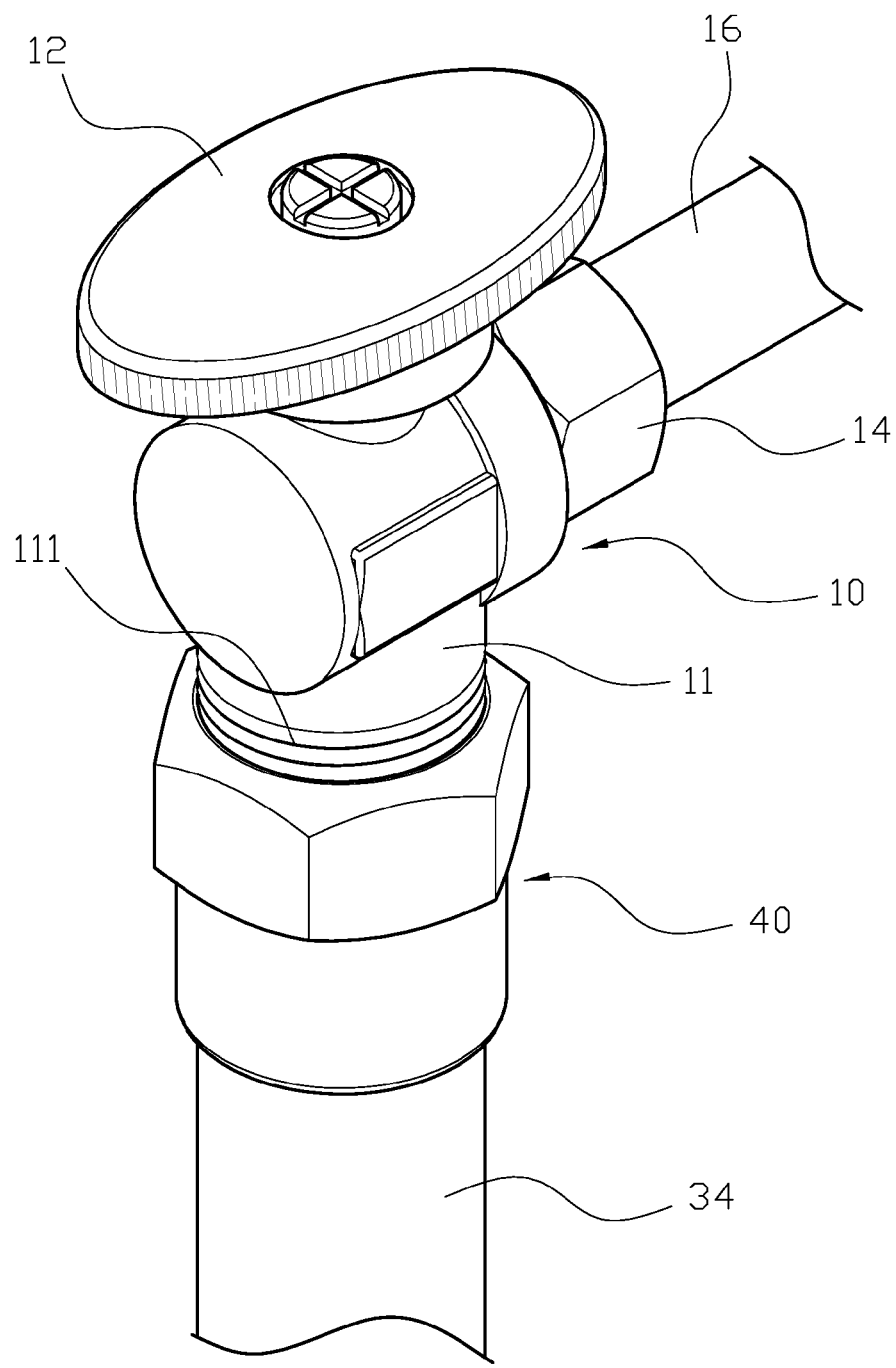
FIG. 1 illustrates a three-dimensional view of the present invention.
Figure 2:
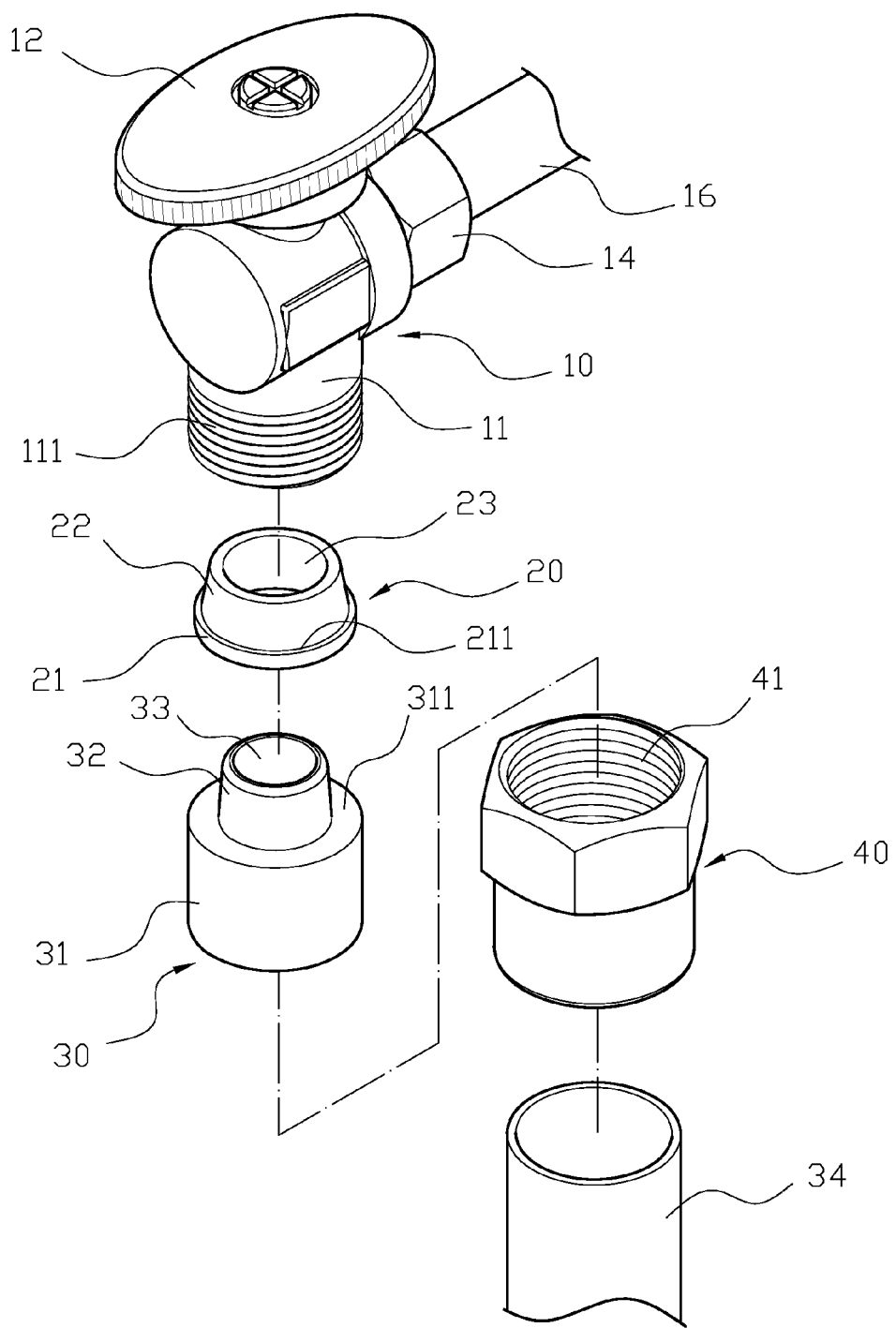
FIG. 2 illustrates a three-dimensional exploded view of the present invention.
Figure 3:
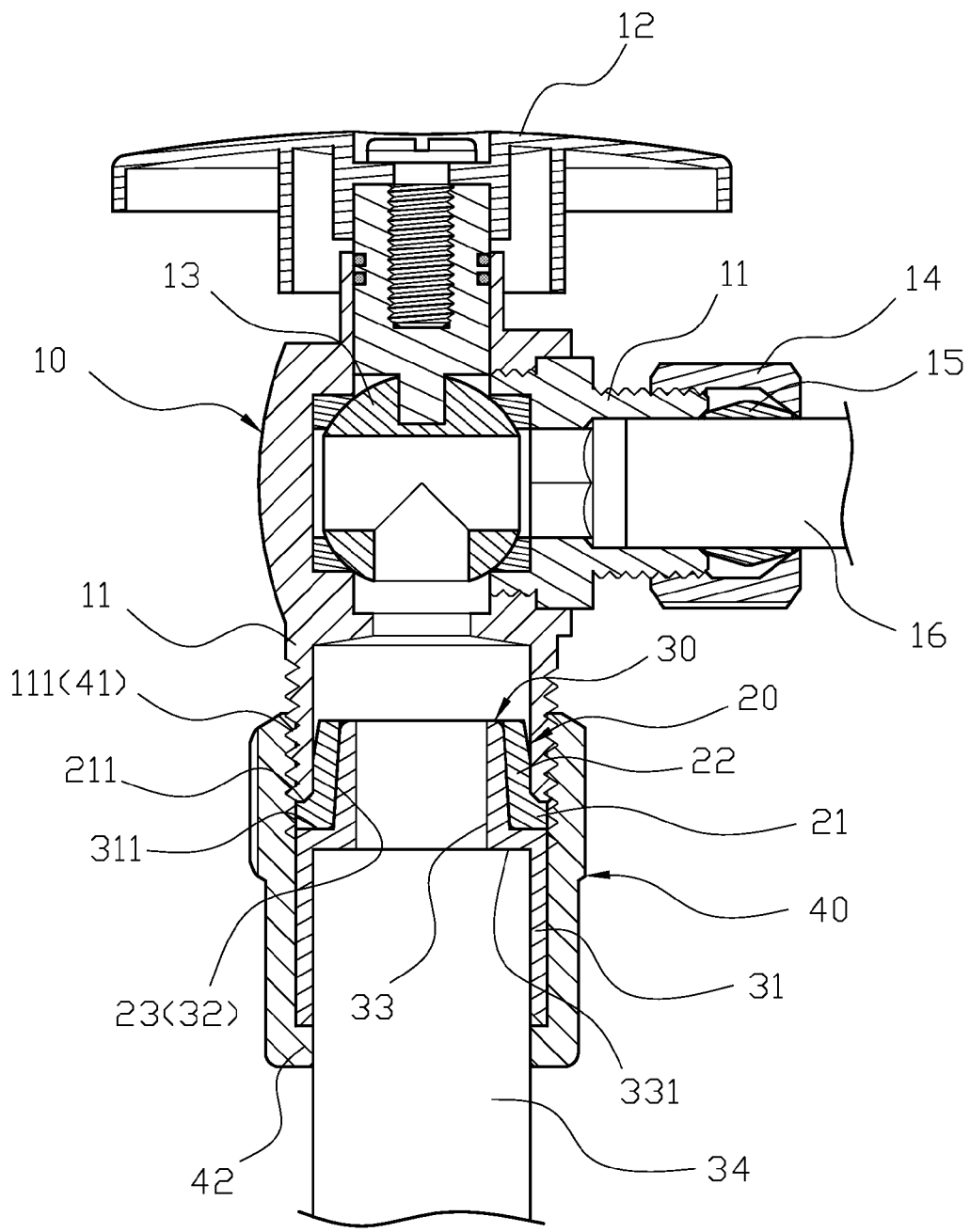
FIG. 3 illustrates a sectional view of the present invention.

In order to further understand the goal, characteristics and effect of the present invention, a number of embodiments along with the drawings are illustrated as following:

Referring to FIGS. 1 to 3, a valve structure may include a valve body (10), a resilient cover (20), a connecting unit (30) and a locking cover (40). The valve body (10) has multiple connecting tubes (11), and a handle (12) is formed at junctions of the connecting tubes (11), and the connecting tube (11) has outer threads (111). Also, the valve body (10) has a ball valve (13) inside and the handle (12) is connected to the ball valve (13) to form a switch. One end of the resilient cover (20) forms a ring portion (21), diameter of which is larger than that of the connecting tube (11). The other end of the resilient cover has a tapered cone portion (22), diameter of which is smaller than the connecting tube (11). A first stopping surface (211) is formed from the ring portion (21) facing the cone portion (22), and a through hole (23) is formed between the ring portion (21) and the cone portion (22), and the through hole (23) is enlarging from the cone portion (22) to the ring portion (21). The resilient cover (20) plugs into the connecting tube (11) through the cone portion (22), and the first stopping surface (211) of the ring portion (21) is against the connecting tube (11) to form a restricting position, so that the through hole (23) of the resilient cover (20) is communicating with the connecting tube (11) of the valve body (10). The connecting unit (30) is tubular having a tubular connecting section (31) and a plugging section (32) with shrinking diameter. A second stopping surface (311) is formed from the tubular connecting section (31) facing the plugging section (32), and the plugging section (32) of the connecting unit (30) plugs into the through hole (23) of the resilient cover (20), so the second stopping surface (311) is against the ring portion (21) of the resilient cover (20). Also, the plugging section (32) of the connecting unit (30) is shrinking from the tubular connecting section (31), so the plugging section (32) can easily plug into the through hole (23) to form a tight sealing effect. Furthermore, a through opening (33) is formed between the tubular connecting section (31) and the plugging section (32) of the connecting unit (30), and the inner wall of the through opening (33) toward the direction of the tubular connecting section (31) has a third stopping surface (331). A PVC tube (34) is plugged at the through opening (33) of the connecting unit (30), so the PVC tube can be attached and secured to the third stopping surface (331). The locking cover (40) covers the tubular connecting section (31) of the connecting unit (30), and inner threads (41) are used to engage with the outer threads (111) of the connecting tube (11) to secure the connecting unit (30) and the resilient cover (20) at the connecting tube (11) of the valve body (10). A stopping ring (42) is formed on an opposite end of the inner threads (41) of the locking cover (40), and the stopping ring (42) connects to the tubular connecting section (31) of the connecting unit (30) to prevent the connecting unit (30) from falling off from the stopping ring (42), wherein the connecting tube (11) of the valve body (10) may have a nut (14), and a conjugating unit (15) is disposed between the connecting tube (11) and the nut (14), and an outer metal tube (16) is connected due to the pressure from the nut (14) to the conjugating unit (15).

Referring to FIGS. 1 to 3 for the structure of the valve, the resilient cover (20) is disposed at the plugging section (32) of the connecting unit (30), so that the resilient cover (20) can tightly cover the plugging section (32) through the through hole (23), and the ring portion (21) can press on the second stopping surface (311) of the connecting unit (30) to form a stable conjugation of the resilient cover (20) and the connecting unit (30). Furthermore, the tubular connecting section (31) of the connecting unit (30) is disposed into the locking cover (40), so the stopping ring (42) can block the connecting unit (30). Finally, the inner threads (41) of the locking cover (40) engage with the outer threads (111) of the connecting tube (11) to enable the resilient cover (20) and the connecting unit (30) to be clamped between the connecting tube (11) of the valve body (10) and the locking cover (40). Meanwhile, the cone portion (22) of the resilient cover (20) is pressed to plug into the connecting tube (11), and the first stopping surface (211) of the resilient cover (20) is pressed at the opening of the connecting tube (11), so the ring portion (21) of the resilient cover (20) is clamped between the connecting tube (11) and the connecting unit (30) to enhance the positioning effect and the anti-leaking effect.

Figure 4:
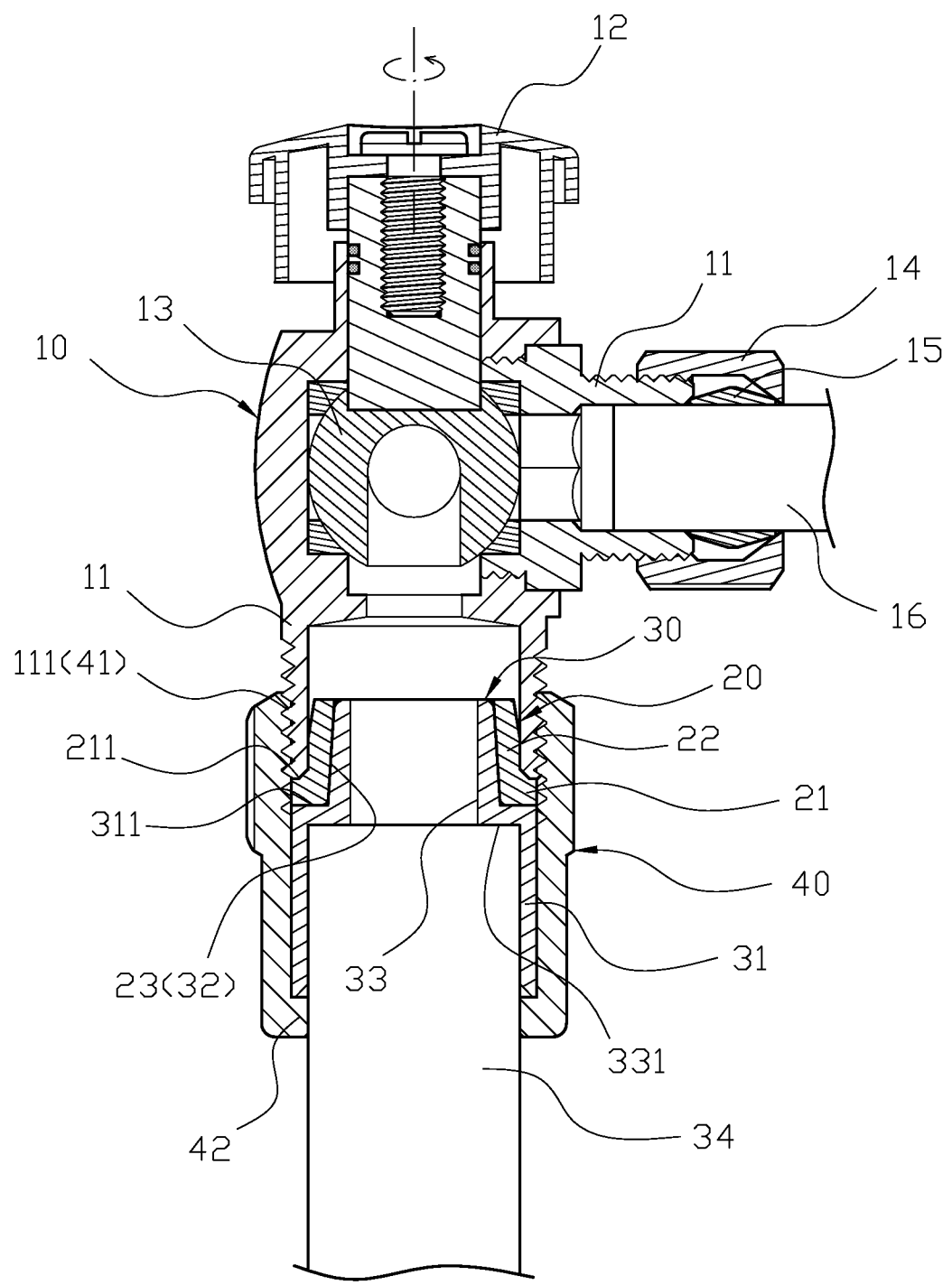
FIG. 4 illustrates a schematic view when the present invention is in use.

Referring to FIG. 4, when the valve structure is in use, the through opening (33) of the connecting unit (30) is provided for the PVC tube (34), and the PVC tube (34) can be glued with the connecting unit (30) to be secured. The connecting tube (11) of the valve body (10) can connect the metal tube 16 through the nut (14) and the conjugating unit (15), namely to connect different types of tubes. The handle (12) can be used to drive the ball valve (13) of the valve body (10) to switch the valve.

According to the embodiments described above, the present invention is advantageous because (i) one end of the resilient cover (20) forms a ring portion (21), diameter of which is larger than that of the connecting tube (11), and the other end of the resilient cover has a tapered cone portion (22), diameter of which is smaller than the connecting tube (11), and the resilient cover (20) is squeezed and clamped between the connecting tube (11) and the connecting unit (30) to achieve the goal of anti-leaking; (ii) a first stopping surface (211) is formed from the ring portion (21) facing the cone portion (22), and a second stopping surface (311) is formed from the tubular connecting section (31) facing the plugging section (32), an when the resilient cover (20) and the connecting unit (30) are disposed at the connecting tube (11), the first stopping surface (211) of the ring portion (21) is against the connecting tube (11), and the second stopping surface (311) of the connecting unit (30) is against the ring portion (21) of the resilient cover (20), so as to use the ring portion (21) to enhance the positioning effect of the resilient cover (20), so the resilient cover (20) will not deform too much generate movement and the contact areas of the connecting tube (11), resilient cover (20) and connecting unit (30) are increased to enhance the anti-leaking effect; and (iii) the through hole (23) is enlarging from the cone portion (22) to the ring portion (21) and the plugging section (32) of the connecting unit (30) is shrinking from the tubular connecting section (31), so the plugging section (32) can easily plug into the through hole (23) to form a tight sealing effect.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A valve structure comprising:

a valve body having a plurality of connecting tubes that have outer threads; and a handle formed at junctions of the connecting tubes;

a resilient cover, one end of which forming a ring portion having larger diameter than that of the connecting tube, the other of which having a tapered cone portion, diameter of which smaller than the connecting tube; a first stopping surface formed from the ring portion facing the cone portion, a through hole formed between the ring portion and the cone portion, wherein the resilient cover plugs into the connecting tube through the cone portion, and the first stopping surface of the ring portion is against the connecting tube to form a restricting position, so that the through hole of the resilient cover is communicating with the connecting tube of the valve body;

a connecting unit that is tubular, having a tubular connecting section and a plugging section with shrinking diameter; a second stopping surface formed from the tubular connecting section facing the plugging section, wherein the plugging section plugs into the through hole of the resilient cover, so the second stopping surface is against the ring portion of the resilient cover; and a locking cover covering the tubular connecting section of the connecting unit, and inner threads thereof are used to engage with the outer threads of the connecting tube to secure the connecting unit and the resilient cover at the connecting tube of the valve body, wherein a through opening is formed between the tubular connecting section and the plugging section of the connecting unit, and the inner wall of the through opening toward the direction of the tubular connecting section has a third stopping surface, and a PVC tube is plugged at the through opening of the connecting unit, so the PVC tube is attached and secured to the third stopping surface.

2. The valve structure of claim 1, wherein a stopping ring is formed on an opposite end of the inner threads of the locking cover, and the stopping ring connects to the tubular connecting section of the connecting unit to prevent the connecting unit from falling off from the stopping ring.

3. The valve structure of claim 1, wherein the through hole is enlarging from the cone portion to the ring portion, and the plugging section of the connecting unit is shrinking from the tubular connecting section, so the plugging section is allowed to easily plug into the through hole to form a tight sealing effect.

4. The valve structure of claim 1, wherein the valve body has a ball valve inside and the handle is connected to the ball valve to form a switch.

5. The valve structure of claim 1, wherein the connecting tube of the valve body has a nut, and a conjugating unit is disposed between the connecting tube and the nut.

* * * * *